Figure 1:
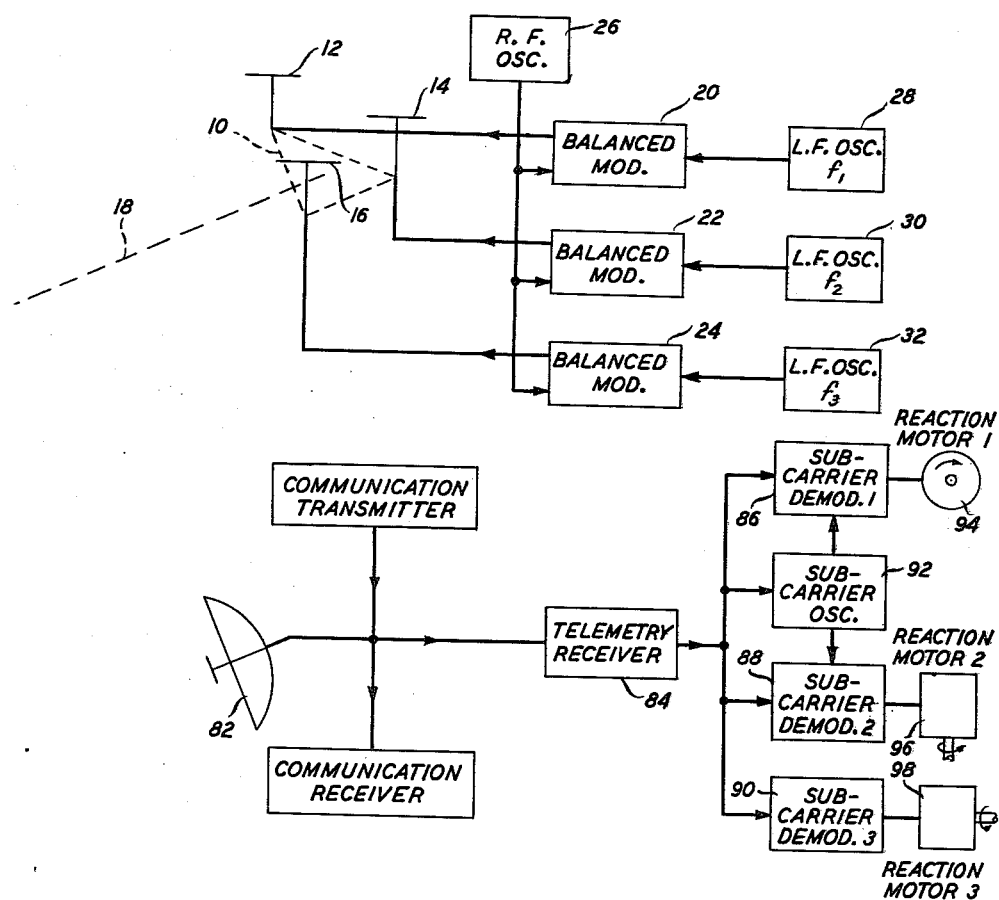

May 7, 1963    C. C. CUTLER    3,088,697
ATTITUDE CONTROL FOR SATELLITE VEHICLES
Filed Dec. 28, 1959    2 Sheets-Sheet 1

INVENTOR
C. C. CUTLER
BY
ATTORNEY

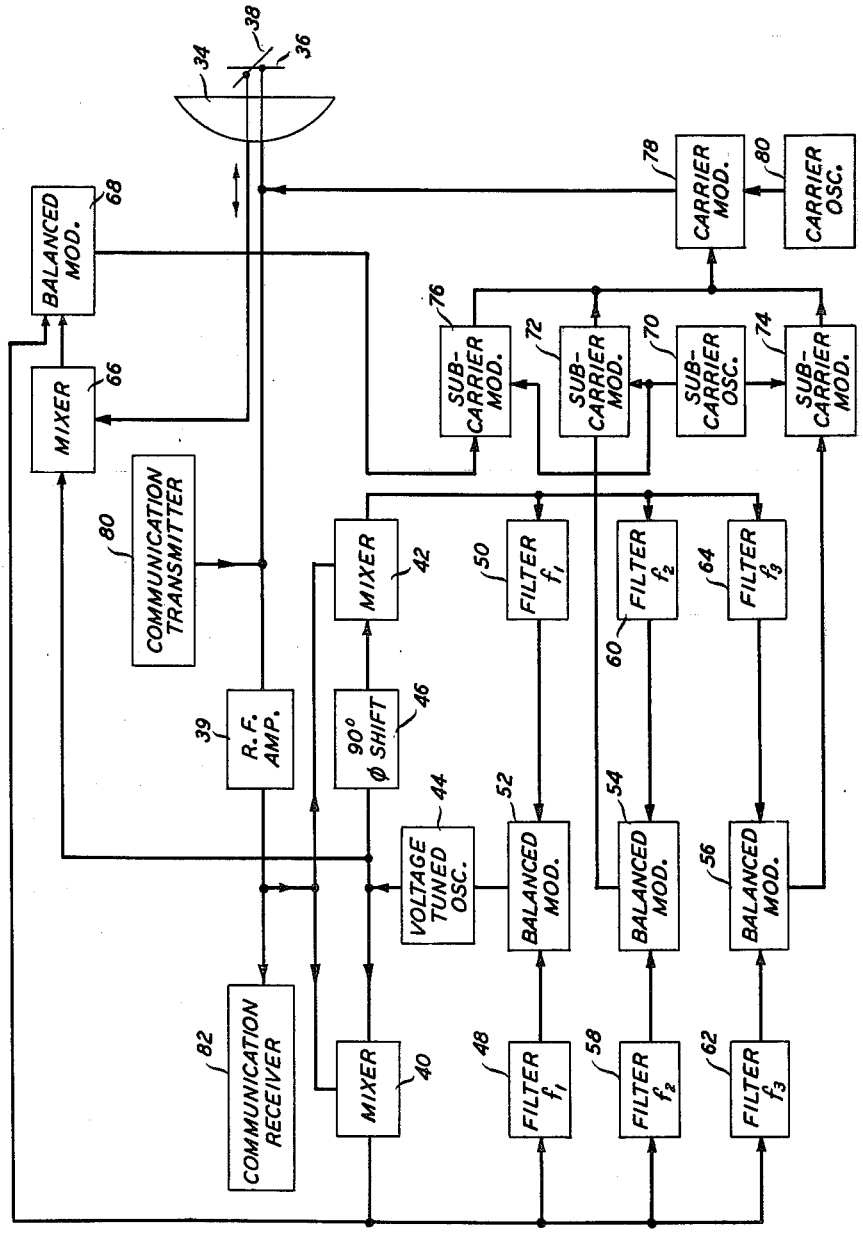

United States Patent Office 3,088,697
Patented May 7, 1963

3,088,697
ATTITUDE CONTROL FOR SATELLITE VEHICLES
Cassius C. Cutler, Gillette, N.J., assignor to Bell Telephone Laboratories, Incorporated, New York, N.Y., a corporation of New York
Filed Dec. 28, 1959, Ser. No. 862,200
5 Claims. (Cl. 244—14)

This invention relates to space satellites and more particularly to systems for remotely controlling the attitude or orientation of a space vehicle from a base station and to satellite vehicles arranged for use with such control systems.

There have been many proposals for the use of space vehicles as elements of broadband microwave radio communication systems. The most common of these proposals involves the use of one or more satellite vehicles as the repeater stations of a radio relay system capable of handling extremely broadband signals. According to such proposals, the satellite vehicle may constitute a passive repeater which, in its simplest form, comprises no more than a spherical metalized body, such as a balloon, which serves as an isotropic reflector. In more sophisticated systems, however, active repeaters are contemplated. Here, the space vehicle carries transmitting and receiving antennas, together with active electronic circuits arranged to amplify and in some instances to regenerate received signals to prepare them for retransmission to a distant point. In all cases in which an active repeater is employed, and indeed in many cases in which a passive repeater having directional characteristics is used, it becomes necessary to control the attitude or spatial orientation of the satellite vehicle or of the antenna systems mounted thereon.

One class of orientation system for such purposes finds application in and is limited to those instances in which the space vehicle may be launched with an initial spin so that the axis of maximum moment of inertia tends to become oriented normal to the plane of the orbit in which the vehicle is traveling. If means are provided to prevent degradation of such an initial spin, satisfactory control of orientation may be accomplished for the specific case mentioned.

According to another proposal which forms the subject of my copending application Serial No. 843,737, filed October 1, 1959, now Patent 3,060,425, issued October 23, 1962, a remote control system is provided which includes means for determining at a base station the attitude of the satellite vehicle in question and for producing control signals for radiation to the vehicle at which location active mechanism is caused to operate in such a way as to adjust the orientation of the vehicle. Such systems, of course, involve a relatively high degree of complexity and every effort is made to simplify them to the greatest degree possible consistent with the precision of orientation control required. Thus, and as described in the above-identified copending application, a series of antennas mounted in a plane on the satellite vehicle may be caused to radiate signals from which interferometric measurements may be made of the orientation of that plane with respect to the line of sight extending from the satellite to a base station by which the satellite is to be controlled. Also disclosed in the above-identified application are arrangements responsive to the signals from such antennas for determining appropriate order signals for transmission to the satellite to control its orientation.

While orientation control systems of the type referred to above are extremely useful in some applications, it is recognized that they do not furnish certain information as to the behavior of the satellite vehicle, which may be of extreme importance in communication systems. Thus, while the orientation of a reference plane of the satellite may be measured and controlled with respect to the line-of-sight axis to the base station, no information is obtainable nor is any control possible over rotation of the reference plane (and of the satellite vehicle) about the line-of-sight axis.

It is accordingly the object of the present invention to improve the precision of remote attitude control systems for satellite vehicles and to eliminate ambiguities inherent in the operation of systems heretofore proposed.

In accordance with the above object, the attitude of a space satellite is remotely controlled through the use of an array of antennas mounted on the satellite in a plane transverse to an axis of the satellite which is to be aligned with the line of sight extending from the satellite to a base or control station. As in my copending application referred to above, these antennas are supplied with different suppressed-carrier, double-sideband signals and these signals are employed at the base station to generate control signals for transmission to the satellite to correct the orientation of the reference plane thereon. Rotation of the satellite about the line-of-sight axis is detected and controlled by distinctively polarizing the signal radiated from one of the antennas of the satellite array. At the receiver, this signal is separated on a polarization basis and employed to generate an error signal for transmission to the satellite to adjust the angular position thereof about the line-of-sight axis.

The above and other features of the invention will be considered in the following specification taken in connection with the drawings in which:

FIG. 1 is a block diagram of the arrangements included on a space satellite vehicle to be used according to the invention; and FIG. 2 is a block schematic diagram of the circuitry provided at the base or control station for use in controlling the attitude of the space vehicle of FIG. 1.

As in the system disclosed in my copending application, the general approach to the problem of control of the attitude of the space vehicle involves the generation and radiation of signals from the satellite having such distinguishing characteristics that interferometric measurements made at the base station serve to determine the relative distances from the base station to predetermined points on the space vehicle. Such determinations permit measurement of the orientation of a reference axis of the vehicle with respect to the line of sight extending from the vehicle to the base station. As shown in FIG. 1, the space vehicle is provided with an array of antennas 10, here shown as comprising three simple dipole antennas 12, 14, and 16, disposed in triangular configuration in a plane which is to be maintained normal to the line of sight extending from the space vehicle to the control station. This line of sight is indicated in FIG. 1 by the dashed line 18 which is taken as normal to the plane of antenna array 10.

Arrangements are provided for radiating from antennas 12, 14, and 16 distinctive suppressed-carrier, double-sideband signals. These are produced by balanced modulators 20, 22, and 24 associated respectively with antennas 12, 14, and 16 to each of which is applied the output of a radio frequency oscillator 26 operating at an appropriate carrier frequency. Also applied to the respective modulators are the outputs of low-frequency oscillators 28, 30, and 32 which operate at different frequencies $f_1$, $f_2$, and $f_3$. The signals radiated from antennas 12, 14, and 16 thus constitute double-sideband, suppressed-carrier signals, all generated from the same radio frequency carrier but readily distinguishable one from the other on the basis of the low-frequency modulation signals by which they were generated.

The remaining elements of the control system found on the satellite vehicle are arranged to accept control signals generated at the base station and to produce appropriate changes in the orientation of the vehicle. These devices will be considered in greater detail below.

At the base station and as shown in FIG. 2, signals radiated from antenna array 10 of the satellite are received by antenna 34 which is shown as comprising the conventional parabolic reflector furnished with two cross-polarized dipole radiators 36 and 38. Signals derived from dipole 36 are, as in the control station described in my copending application, employed to produce error signals indicative of the orientation of the reference plane of the satellite vehicle with respect to the line-of-sight axis. Thus, after amplification in the radio frequency amplifier 39, the suppressed-carrier signals are divided into two portions and applied to mixers 40 and 42. Also applied to mixers 40 and 42 is the output of a local oscillator 44, that portion of the oscillator output applied to mixer 42 passing first through a phase shifter 46 which introduces a 90 degree phase shift. Output signals from mixers 40 and 42, respectively, are applied by way of filters 48 and 50, tuned to the modulating frequency $f_1$, employed at the satellite transmitter to the inputs of a balanced modulator 52.

The output of this balanced modulator is a voltage, the amplitude and polarity of which are a measure of the departure of the phase of local oscillator 44 from the phase of the carrier employed at the transmitter and may be utilized in known manner to control or adjust the phase, and thus the frequency of local oscillator 44. This system of oscillator-frequency control is such that double-sideband, amplitude-modulated signals are caused to yield the modulating signals directly by so-called synchronous detection which requires that the locally generated carrier hold the same frequency as and be coherent in phase with the carrier employed at the transmitter in which the sidebands were generated.

The output of local oscillator 44 is also employed to demodulate the paired sidebands produced by the remaining antennas of the satellite transmitter. For this purpose, the outputs of mixers 40 and 42 are also applied to the inputs of balanced modulators 54 and 56 by way of paired filters 58 and 60, and 62 and 64, respectively, which are tuned to the modulating frequencies $f_2$ and $f_3$, employed in the generation of the double-sideband signals at the satellite transmitter. Balanced modulators 54 and 56 are thus caused to produce outputs similar to that produced by balanced modulator 52 but differing therefrom in that they represent, respectively, the phase differences between the carrier generated by local oscillator 44 and the carriers which would have been reconstituted in oscillator 44 had the corresponding sideband pairs been employed for control of that oscillator rather than the sideband pair which, in fact, is utilized to control that oscillator. The differences so measured then represent differences in phase of the signals arriving at dipole antenna 36 from the three antennas 12, 14, and 16 of the satellite vehicle. These phase differences, therefore, are a measure of the orientation of the reference plane with respect to the line of sight to the base station and disappear only when the three antennas are equally distant from the base station representing that condition in which the reference plane is normal to the line of sight extending from the satellite to the base station.

It will be recognized that the arrangements thus far considered are capable of providing information at the base station from which the orientation of the reference plane of the satellite vehicle may be determined with reference to the line of sight. However, it is apparent that an ambiguity is possible since the antenna array 10 of the satellite vehicle may rotate about the line of sight as an axis without in any way altering the distance from the respective antennas to the base station. Thus the satellite vehicle may spin about the line-of-sight axis and this motion of the satellite can neither be detected nor controlled by the system thus far described.

The ambiguity may be resolved, however, by using a second distinguishing characteristic of the double-sideband signals produced at and radiated from the space vehicle. Conveniently such characteristic may be the polarization of the energy radiated from the satellite. If linear polarization is used the maximum response will be obtained when the polarization of the receiver dipole 36 is coplanar with the dipoles 12, 14, and 16 on the vehicle. A crossed dipole 38 will receive no signal when the satellite is oriented as desired, i.e., so that the dipoles are coplanar. In order to maintain this desired attitude the output of the crossed dipole 36 is compared with that from dipole 38 by additional circuitry shown in FIG. 2. The output of dipole 36 is demodulated in mixer 66 by beating it with the output of the voltage tuned oscillator 44. When the satellite is misoriented slightly, the demodulated sidebands will appear as audio frequency signals in the output of mixer 66. The phase of these signals will depend upon the direction in which the satellite is misoriented about the axis along the line of sight from the satellite to the base station. The audio frequency output from mixer 66 is of the same nature as that from mixer 40, and will be either in phase or 180 degrees out of phase, depending upon orientation. Comparison of these two audio frequency signals in balanced modulator 68 gives rise to a direct-current voltage, the polarity and amplitude of which are a measure of the orientation. This voltage can be used as a control voltage to correct the orientation, as was done for the other two control axes described above.

All of the direct-current signals appearing at the outputs of balanced modulators 52, 54, 56, and 68 are thus suitable for use as error or control signals for radiation to the satellite vehicle. Accordingly, these signals are combined with the output of a subcarrier oscillator 70 in modulators 72, 74, and 76, respectively, the modulated outputs of which are applied together to a carrier modulator 78 and there modulated upon a radio frequency carrier generated by an oscillator 80. The output of this modulator is applied to dipole 36 of the antenna and radiated to the satellite vehicle. Known techniques are employed to separate the transmitted and received signals and the same antenna may be employed for both directions of transmission.

At the satellite vehicle and as shown in FIG. 1, an antenna 82 receives signals from the base station and applies them to a telemetry receiver 84 in which they are separated on a frequency basis to yield three subcarrier-modulated error signals corresponding respectively to the outputs of balanced modulators 54, 56, and 68. These signals are applied to demodulators 86, 88, and 90, respectively, and there combined with the output of an oscillator 92, tuned to the frequency of the subcarrier oscillator 70 at the base station. Such demodulation results in the production of direct-current control signals of amplitude and polarity representative of those quantities derived at the base station from the attitude-detection equipment previously described.

Although many arrangements have been proposed for use in changing or adjusting the attitude of a space vehicle, that shown in FIG. 1 of the drawings is based upon the principle of conservation of momentum. Thus, if a mass mounted within the satellite vehicle is rotated about a chosen axis in one direction and at a particular velocity, a corresponding rotation of the satellite vehicle will occur about the same axis in the opposite direction and at a related velocity. Accordingly, the outputs of demodulators 86 and 88 are applied to a pair of reaction motors 94 and 96, respectively, the rotational axes of which are normal to each other and to the line of sight extending from the satellite vehicle to the base station. Each of motors 94 and 96 may be arranged to drive a small flywheel, or the armature of the motor itself may serve as the rotating mass referred to above and required to cause rotation in the opposite sense of the satellite vehicle about the corresponding axis of rotation. A third reaction motor 98 is mounted with its axis of rotation normal to those of reaction motors 94 and 96 and to the reference plane of antenna array 10. The axis of rotation of motor 98 thus lies along the line-of-sight axis 18 and this motor may, through application of the principles of the law of conservation of momentum, produce correcting rotations of the satellite vehicle about the line-of-sight axis. Control signals for this motor are present at the output of demodulator 90 and are applied to this motor to effect such correcting rotations.

In the arrangement shown, the satellite will be rotated about the line-of-sight axis until dipole 36 at the receiver receives no signal by virtue of being oriented at right angles to all three antennas 12, 14, and 16 of the satellite. This is the condition required for correct orientation of the reference plane described above.

What is claimed is:

1. In a system for determining the attitude of a space vehicle from a base station, means for producing distinctive signals for radiation from spaced points in a reference plane on said vehicle, means for radiating said signals as linearly polarized waves of predetermined polarization, receiving means at the base station responsive with greatest efficiency to waves of a first polarization, means for measuring the relative phases of signals reaching said receiving means from said spaced points to determine the relative distance of said points from said base station, second receiving means responsive with greatest efficiency to waves of a second polarization, and means for comparing representative signals from said first and second receiving means to measure the rotation of said reference plane about the line of sight to said base station.

2. In a system for controlling the attitude of a space satellite, a plurality of radiators disposed on the satellite in a plane normal to an axis of the satellite to be controlled, means for generating from a single carrier separate double-sideband signals for radiation as linearly polarized waves of the same polarization by respective ones of said radiators, means at a base station for receiving and demodulating one of said double-sideband signals to reconstitute the carrier, means employing the reconstituted carrier for demodulating the other double-sideband signals responsive with greatest efficiency to a polarization differing from that of said receiving means for separately detecting the signal from said satellite, and means for generating control signals for radiation to the satellite proportional to the relative phases and amplitudes of the demodulated outputs corresponding to all of said other pairs of sidebands.

3. In a system for controlling the orientation of a space satellite from a base station, a plurality of radiators mounted on the satellite in a reference plane, means for generating from a single carrier different double-sideband, suppressed-carrier signals for radiation from said satellite with predetermined linear polarizations, first receiving means responsive with greatest efficiency to waves having a first plane of polarization, means for demodulating one of the double-sideband signals from said first receiving means to reconstitute the carrier, means employing the reconstituted carrier to demodulate the remainder of said double-sideband signals to yield outputs, the polarities and amplitudes of which are a measure of the relative distances of said radiators to said base station, second receiving means responsive with greatest efficiency to waves in a second plane of polarization, means for combining the reconstituted carrier with the output of said second receiving means to yield modulation sidebands, and means for combining said sidebands with those recovered by demodulation of the output of said first receiving means to yield an additional output, the amplitude and polarity of which is a measure of the rotation of the plane of polarization of signals radiated from said satellite.

4. Apparatus for the determination of the orientation of a reference plane on a mobile transmitter from plural suppressed-carrier, double-sideband signals radiated from different antennas spaced in said reference plane, a local generator of carrier signals, means utilizing the local carrier for receiving and demodulating one of said double-sideband signals to control said local generator to reconstitute said carrier, means employing the reconstituted carrier for demodulating the other double-sideband signals from said mobile transmitter and producing outputs corresponding to the relative distances of the antennas radiating said other pairs of said sidebands, additional means responsive with greatest efficiency to signals of a predetermined polarity, and means for utilizing the local carrier for demodulating signals received by said additional means and producing an output which varies with the rotation of said reference plane about the line of sight from the mobile transmitter to said apparatus.

5. In a system for controlling the attitude of a space satellite from a base station, a plurality of radiators disposed on the satellite in a plane transverse to an axis of the satellite to be controlled, means for generating from a single carrier separate suppressed-carrier signals for radiation by respective ones of said radiators, means at the base station for receiving and demodulating one of said double-sideband signals to control reconstitution of the carrier, means employing the reconstituted carrier for demodulating the other double-sideband signals, additional receiving means responsive with greatest efficiency to signals of a predetermined polarization, means for demodulating signals received by said additional means with said reconstituted carrier, and means for generating control signals for radiation to said satellite proportional to the polarities and amplitudes of the demodulated outputs corresponding to said other pairs of sidebands.

References Cited in the file of this patent

Vista in Astronautics, vol. I, TL 787U5, Pergamon Press, New York, 1958, p. 103.
Electronics, April 24, 1959, pp. 72–74.